US011582283B2

United States Patent
Cannon et al.

(10) Patent No.: US 11,582,283 B2
(45) Date of Patent: *Feb. 14, 2023

(54) EDGE COMPUTING SYSTEM

(71) Applicant: Veea Systems Ltd., Bath (GB)

(72) Inventors: Mark Joseph Cannon, Gloucestershire (GB); Neil Edgar, Wiltshire (GB)

(73) Assignee: VEEA SYSTEMS LTD., Bath (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/167,636

(22) Filed: Feb. 4, 2021

(65) Prior Publication Data

US 2021/0160345 A1 May 27, 2021

Related U.S. Application Data

(63) Continuation of application No. 16/223,772, filed on Dec. 18, 2018, now Pat. No. 10,944,851.

(30) Foreign Application Priority Data

Dec. 22, 2017 (GB) ...................................... 1721776

(51) Int. Cl.
*G06F 15/16* (2006.01)
*H04L 67/01* (2022.01)
(Continued)

(52) U.S. Cl.
CPC ................ *H04L 67/01* (2022.05); *G06F 8/60* (2013.01); *G06F 9/44505* (2013.01);
(Continued)

(58) Field of Classification Search
CPC ...... G06F 9/44505; G06F 2009/45595; H04W 84/18; H04L 67/34
(Continued)

(56) References Cited

U.S. PATENT DOCUMENTS

| 9,537,745 | B1 | 1/2017 | Halcrow |
|---|---|---|---|
| 10,944,851 | B2 | 3/2021 | Cannon |

(Continued)

OTHER PUBLICATIONS

European Patent Application No. 18 212 036.0-1224; Communication Pursuant to Article 94(3); dated Apr. 1, 2020; 4 pages.
(Continued)

*Primary Examiner* — Lan Dai T Truong
(74) *Attorney, Agent, or Firm* — Fitch, Even, Tabin & Flannery LLP

(57) ABSTRACT

A method of traffic reduction in a mesh computing system (400), the mesh computing system (400) comprising hosts located on edge nodes of the mesh computing system (400) and a central registry located outside the mesh computing system (400), the central registry holding the images. The method comprises, at a first host located at a first edge node, receiving (920) a request from a client for an image, sending (930) a request for the image to at least one other host of the mesh computing system (400). When the first host receives (940) notification that at least a second host holds the image, the first host downloads (960) the image from the second host to the first host. The first host creates (970) a container from the image. A host at a node (636; 700) and a mesh computing system (400) are also provided.

20 Claims, 16 Drawing Sheets

(51) Int. Cl.
*G06F 9/455* (2018.01)
*H04W 84/18* (2009.01)
*G06F 9/54* (2006.01)
*G06Q 30/0283* (2023.01)
*G06F 8/60* (2018.01)
*G06F 9/445* (2018.01)
*H04L 67/00* (2022.01)

(52) U.S. Cl.
CPC ............ *G06F 9/45558* (2013.01); *G06F 9/54* (2013.01); *G06F 9/547* (2013.01); *G06Q 30/0284* (2013.01); *H04L 67/34* (2013.01); *H04W 84/18* (2013.01); *G06F 2009/4557* (2013.01); *G06F 2009/45595* (2013.01)

(58) Field of Classification Search
USPC .......................... 709/203, 202, 217, 218, 219
See application file for complete search history.

(56) References Cited

U.S. PATENT DOCUMENTS

| | | |
|---|---|---|
| 2014/0280433 A1 | 9/2014 | Messerli |
| 2015/0020065 A1* | 1/2015 | Brant .................. G06F 9/45533 718/1 |
| 2016/0337169 A1 | 11/2016 | Chhabra |
| 2018/0027070 A1 | 1/2018 | Jhanji |
| 2018/0137174 A1 | 5/2018 | Cahana |
| 2019/0199830 A1 | 6/2019 | Cannon |

OTHER PUBLICATIONS

European Patent Application No. 18212036.0; Extended European Search Report dated May 10, 2019.

Great Britain Application No. GB1721776.1.3; Combined Search and Examination Reort Under Sections 17 and 18(3); dated Jun. 25, 2018; 7 pages.

Great Britain Application No. GB1808660.3; Combined Search and Examination Report Under Sections 17 and 18(3); dated Nov. 22, 2018; 8 pages.

* cited by examiner

1300

1310

Calculate cost metric with at least one of:
(i) number of links over which image must be transmitted;
(ii) communication link quality of each link;
(iii) loading on any intermediate edge nodes on the route that would result from downloading the image;
(iv) loading of each link; and/or
(v) financial cost of transmitting on each link.

1320

When route comprises two or more links for (i), (ii) or (iv):
Evaluate the parameter for each link in the route; and
Combine the evaluated parameters for each link.

FIG. 13

EDGE COMPUTING SYSTEM

RELATED APPLICATIONS

This is a continuation of U.S. patent application Ser. No. 16/223,772, filed Dec. 18, 2018, entitled EDGE COMPUTING SYSTEM, which is incorporated by reference in its entirety herein. This application claims the benefit of United Kingdom Application No. 1721776.1, filed on Dec. 22, 2017. The content of this application is fully incorporated herein in its entirety.

TECHNICAL FIELD

The field of the invention is edge computing systems. In particular, the invention concerns an edge computing system that implements virtualisation.

BACKGROUND

In some computing systems, Virtual Machines have been used to allow computing functions to be carried out at a desired location, which may be distant from a location where elements of a computing system were originally installed. Virtualisation at the level of the operating system in an edge computing system enables location-independent computing.

One approach to virtualisation is the use of 'containers'. The aim of employing a container is to try to isolate an application and its dependencies into a self-contained unit that can be run anywhere. The container wraps up a piece of software in a complete file system. The file system then contains everything that it needs to run, such as code, runtime, system tools and system libraries. Containers have thus been used to provide operating-system-level virtualization. It is the very fact that the containerized application includes all the dependencies that enables it to run on any node into which it has been loaded. In turn, therefore, containers can be spread to new nodes relatively easily, and may be easier to update once deployed to multiple nodes.

One aspect of containerization is the use of 'images'. An image is a package that can be executed to run of a piece of software. Thus, the image has the code for the software and information about configuration files. The image will also house libraries that are needed for the software, plus information on required variables. The advantage of images is that they can be moved around as a single entity. In terms of size and the requirements for transfer through a network, they are lightweight in comparison to more traditional Virtual Machines.

Open source projects have facilitated the deployment of various applications inside containers. A typical, but non-limiting, example of an open source approach is shown by 'Docker™'. Other approaches such as 'Kubernetes' and 'Coreos rkt' are alternative approaches.
(i) Details of the Docker™ system are available on the website: http://docs.Docker.com/
(ii) Details of the Kubernetes system are available on the website: https://kubernetes.io/
(iii) Details of the Coreos system are available on the website: https://coreos.com/rkt For example, the Docker™ architecture has three main components. These components are the Host, Client and Registry. In addition, a 'daemon' is provided within the 'Host'. In operation, the daemon selects an image, and creates a runnable instance of that image in a container. Some images are locally available from within the Host itself. Any images that are not available in the Host will be downloaded from the Registry when needed, and then used to create a runnable instance of that image in a container.

FIG. 1 illustrates a possible arrangement of the Host, Client and Registry in a known Docker™ architecture. Computing system 100 in FIG. 1 comprises Docker™ Host 110, Docker™ Registry 120 and Docker™ Client 130.

Docker™ Host 110 comprises Docker™ daemon 112, multiple containers 114 and a Docker™ Repository 116. Within Docker™ Repository 116 are multiple Images 118.

Docker™ Registry 120 holds images 122. Although some images 118 are shown in Docker™ Repository 116, these may for example be images that have been used previously. In operation, Docker™ Host 110 may require further images at some point in the future. Such an image may be selected from images 122 in Docker™ Registry 120 and delivered from Docker™ Registry 120 to Docker™ daemon 112. The image may then be added to those stored in Docker™ Repository 116 of Docker™ Host 110.

Docker™ Host 110, Docker™ Registry 120 and Docker™ Client 130 can all be on the same server. Alternatively, Docker™ Host 110, Docker™ Registry 120 and Docker™ Client 130 can be located on separate servers. A Docker™ client can exist locally on the Docker™ Host or in the cloud, i.e. at a remote location on the internet.

Clients are used in a wide variety of systems, including other systems than the Docker™ system of FIG. 1. In such systems, in general, a client could be a command line interface running in any terminal locally. In all cases, clients communicate to a host through an API (Application Programming Interface).

FIG. 2 illustrates a LAN system 200 that uses containers. LAN system 200 illustrates a simple and typical implementation of containers. In the system of FIG. 2, there are multiple Hosts 210. Each of the Hosts 210 is located on a separate server. Registry 220 is also on another, separate server.

Hosts 210 and Registry 220 of the LAN system 200 of FIG. 2 are connected by an Ethernet LAN 205. A Docker™ Client 230 accesses a Host 210 through an Application Programming Interface (API) 235. Thus, the Docker™ Client 230 may be local to the LAN system 200, as illustrated in FIG. 2. However, alternatively, the Docker™ Client 230 may be remote from the Host 210 that it is accessing. Thus, the location of the Docker™ Client 230 does not play a significant role in the operation of the system of FIG. 2.

Returning to the definitions of the 'image' and 'container', their relationship in known systems can be understood with reference to FIGS. 1 and 2. A container is a runnable instance of an image. The image is passed around a network such as LAN 205 in downloads. The image is stored in the Docker™ repository 118 and the Docker™ registry 120. The Docker™ daemon 112 running on the Docker™ Host 110 takes the image and creates a container in the Docker™ Host 110. When the software runs on the Docker™ Host 110 it is the container that is used.

In the Docker™ system of FIG. 2, a group of computing devices that are running containers can be joined together to form a cluster. That cluster may be termed a 'swarm'. The execution of the commands to control the operation of the swarm may be carried out by a swarm leader. There are several types of nodes in a Docker™ swarm. Worker nodes do not participate in swarm management. There can be one or more manager nodes in the swarm. There is only one swarm leader, which is the primary manager node that makes all swarm management and orchestration decisions for the swarm. The 'orchestrator' is another term used in known systems for the swarm leader.

The Docker™ service allows a swarm of selected Docker™ nodes, such as hosts 210, to work together. Those nodes run a defined number of instances of a replica task, which is itself a Docker™ image. The instances of the replica task are identical, but they may carry out different processes on different Hosts. With this arrangement, the swarm leader is responsible for orchestrating or controlling the swarm. The swarm leader is in effect a controlling entity that decides which hosts will run the container. The swarm leader can run on any node.

Whilst the swarm takes care of managing the services, the end result is a "Docker™ pull". The Docker™ pull causes the Host to get an image from the Registry, if that image is needed and is not already in the Repository of that Registry.

In the LAN system 200 of FIG. 2, each Host 210 will operate by requesting an image separately when that image is not held by that Host 210. The request passes from the particular host 210 over LAN 205 to Registry 220. Each Host 210 may be equipped with its own repository 116, where the image is stored after download. The download of an image from Registry 220 will occur separately to each Host 210 that has requested that image. Potentially those downloads may occur in parallel.

A need exists to provide an edge computing system that can implement virtualization in a mesh network.

SUMMARY OF THE INVENTION

In accordance with a first aspect of the present invention, there is provided a method in accordance with appended claim 1. In accordance with a second aspect of the present invention, there is provided a node of a mesh computing system in accordance with appended claim 13. In accordance with a third aspect of the present invention, there is provided a mesh computing system in accordance with appended claim 16. The dependent claims provide further steps and features of embodiments.

BRIEF DESCRIPTION OF THE DRAWINGS

Exemplary embodiments of the present invention will now be described, by way of example only, with reference to the accompanying drawings, in which:

FIG. 13 provides an illustration of another method of operation in accordance with an embodiment of the invention.

DETAILED DESCRIPTION

Figure 2:
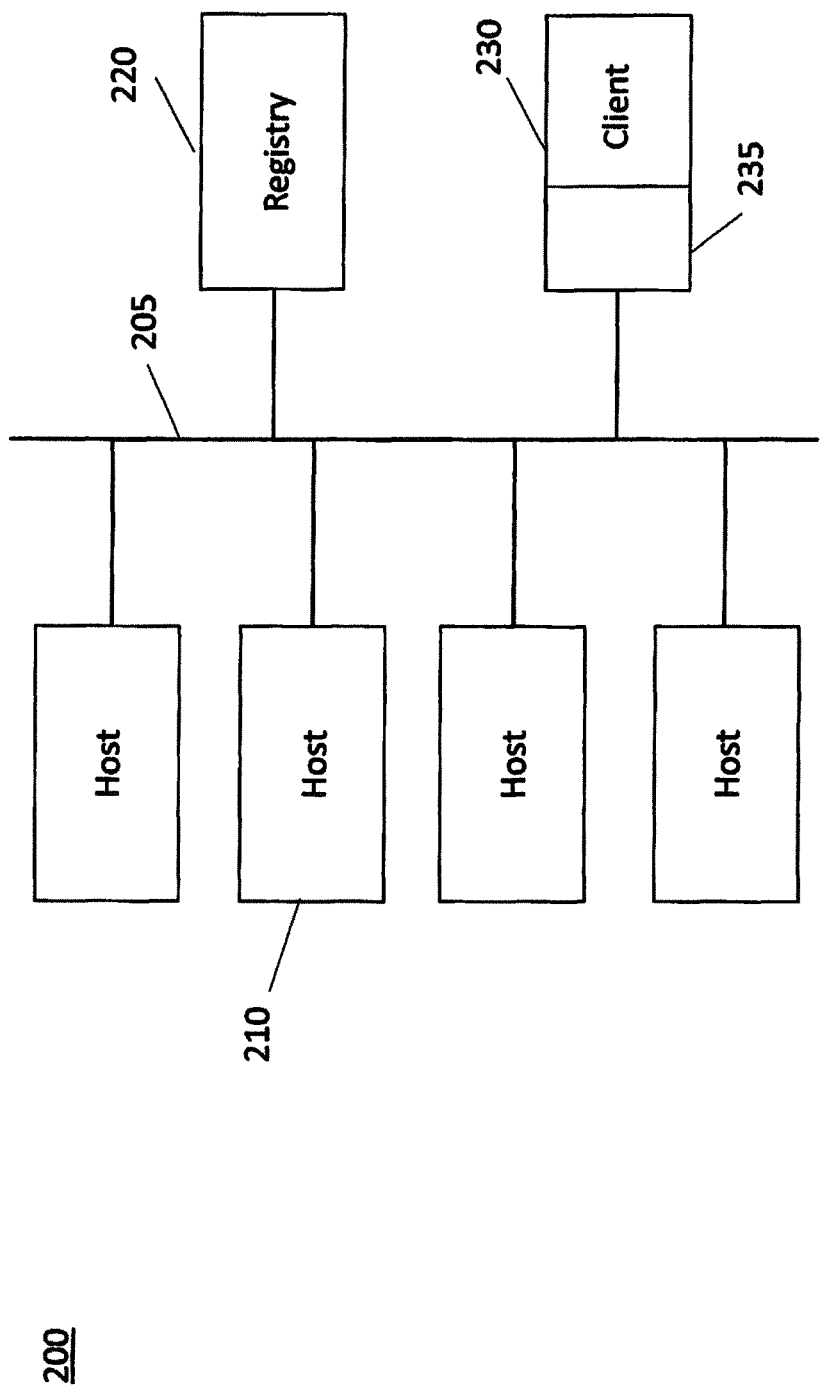
FIG. 2 shows an example of a known LAN architecture using containers, in schematic form.

The parallel downloading of images in the system of FIG. 2 may not provide a particular drain on resources when the system is implemented with a high capacity LAN 205. However, mesh computing systems may not be able to deliver comparable performance to that achievable with a LAN, when attempts are made to implement known virtualization systems on known mesh computing networks.

The present invention addresses systems of hosts where there are constraints on the bandwidth of connections between the nodes in the system. When the hosts are not interconnected with a LAN, they may instead be connected by a variety of links that have significantly constrained bandwidths. In particular, a mesh network is an edge computing system that has wireless links between its nodes. The mesh network may therefore have links between nodes provided by interconnections that show significantly limited bandwidth. The bandwidth limitations may affect transmissions over the interconnections at all times, or just at particular times.

Communication devices in a mesh network communicate using mesh transport technology. That technology is typically either WiFi™ or a cellular link. Both technologies may be employed within one mesh network, for different interconnections between nodes.

Mesh routers may be provided to support routing within the mesh network. Mesh router devices provide routing functionality for data that originates from other devices, which may be either an end node or another mesh router. Such mesh routers can relay traffic from an end node or another mesh router towards an edge router. Mesh router devices also obtain an IPv6 prefix (address) from router advertisements sent from the edge router.

An attempt to implement a mesh computing system using containerisation may result in appreciable bandwidth demand over some of the links in the mesh. The bandwidth demand may also be variable, i.e. different at different times, which makes the demand unpredictable. Although the use of containers is lightweight in terms of resources compared to Virtual Machines (VM), nevertheless the size of such images can be large. The size of the images will lead to appreciable bandwidth demand in any links in the mesh network that have significant bandwidth limits.

Figure 1:
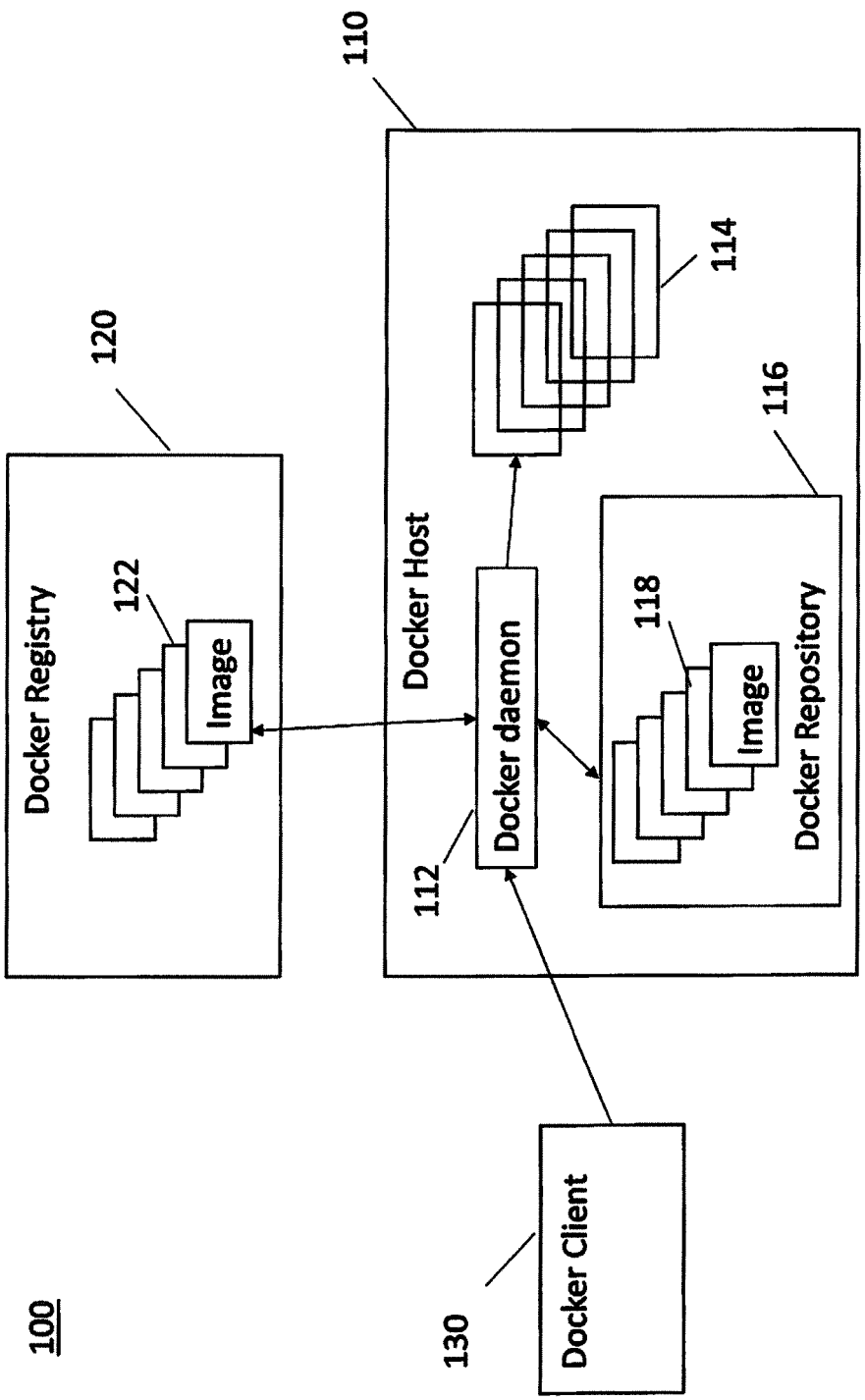
FIG. 1 shows an example of a known Docker™ architecture, in schematic form.
Figure 3:
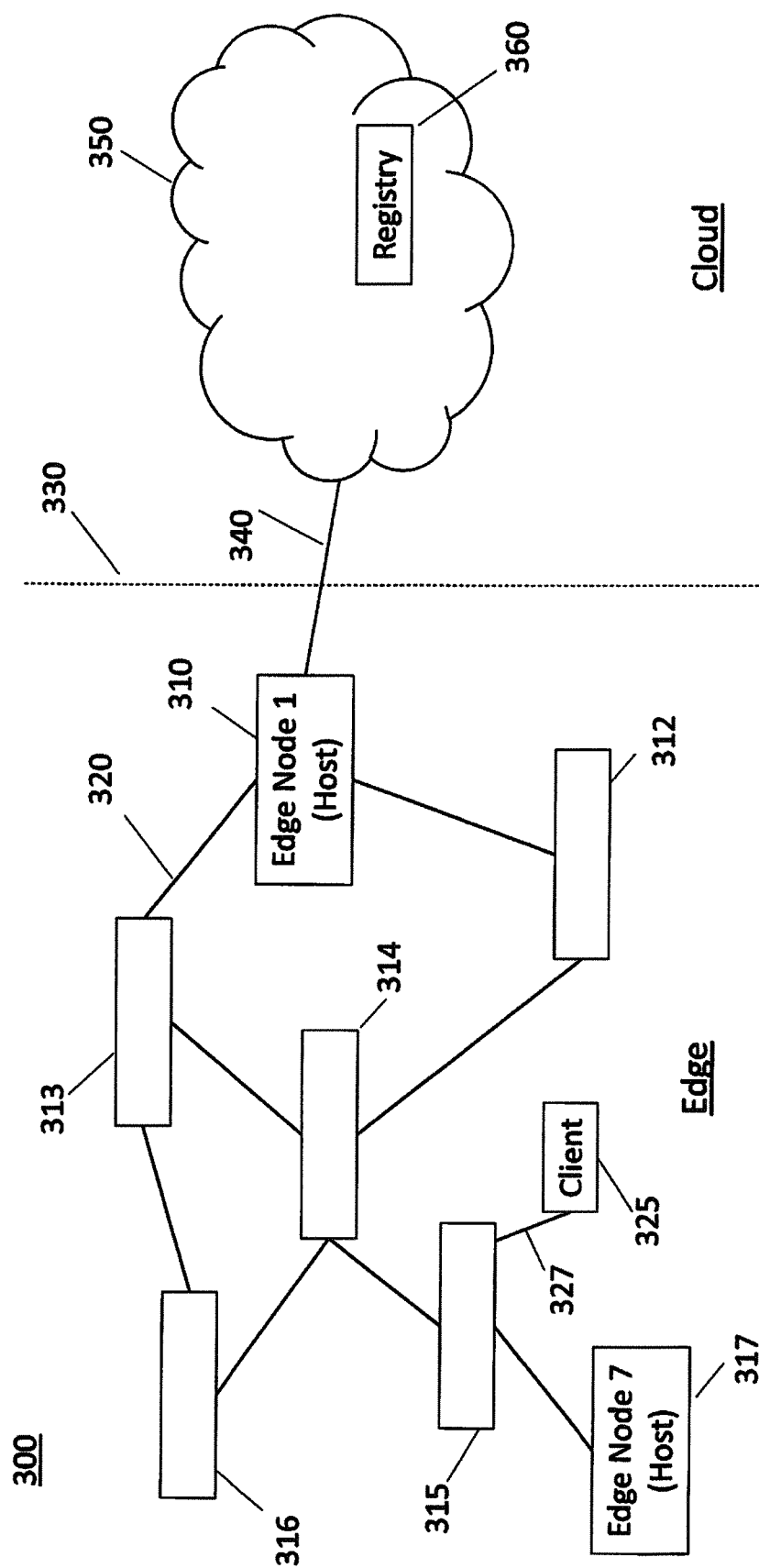
FIG. 3 illustrates the architecture of a known mesh computing system.

FIG. 3 illustrates the architecture of a known mesh computing system 300, in which some links have significant bandwidth constraints. Mesh computing system 300 is illustrated as comprising seven edge nodes, each of which acts as a host. The first edge node has reference 310. Mesh computing system 300 also comprises a second edge node 312, a third edge node 313, a fourth edge node 314, a fifth edge node 315, a sixth edge node 316, and finally a seventh edge node 317. First edge link 320 connects first edge node 310 and third edge node 313. The edge nodes are located in a portion of FIG. 3 that is generally labelled as the 'Edge', and which lies to the left of dividing line 330. Some or all of the edge nodes may correspond to Docker™ Host 110 in FIG. 1.

First edge node 310 is also connected via second link 340 to the internet, which is generally illustrated by global internet 350. Global internet 350 is located in a portion of FIG. 3 that is generally labelled as the 'Cloud', and which lies to the right of dividing line 330. Located within global internet 350 is central registry 360. Central registry 360 may correspond to Docker™ Registry 120 in FIG. 1. Second link 340 may take the form of a standard backhaul link. Central registry 360 is on a server in global internet 350.

Client 325 is shown directly linked to fifth edge node 315 by third link 327. In this example, therefore, client 325 is located on a separate server, i.e. not on fifth edge node 315. However, client 325 could be on the same server as fifth edge node 315. Alternatively, client 325 could be located on the same server as any of the other nodes. As a further alternative, client 325 could be located on a server in global internet 350.

In operation of an edge computing system such as that in FIG. 3, any of the seven edge nodes may require an image that it does not already hold. Each edge node needs to download the required image separately, i.e. independently of the activities of other nodes. The edge node that requires the image will request the required image from central registry 360.

A request by first edge node 310 for an image will pass across second link 340. Second link 340 will then also return the sought image from central registry 360 to first edge node 310. When any of the other six edge nodes requests an image, the request will pass through one or more links such as first link 320, before reaching first edge node 310. Then the request will pass across second link 340 to global internet 350. Second link 340 will then return the sought image from central registry 360 to first node 310, and the image will pass to the requesting node through one or more links such as first link 320.

The size of any image requested from Central registry 360 will vary, based on the container. For example, image sizes might be in the range of 100-400 MB for 'Ubuntu™' based containers. Ubuntu™ is an open source Linux™ language. The image size may, however, drop to about 50-60 MB for 'Alpine' containers. Alpine is another example of an open source Linux™ language.

Image sizes in the range 50-400 MB would not cause appreciable bandwidth demand in the known LAN system 200 of FIG. 2. Similarly, there may not be significant bandwidth demand over some high bandwidth links within mesh computing system 300, and hence no significant problems with transferring such images. However, when any links between nodes, such as first link 320 in FIG. 3, are constrained communication links, there will be bandwidth demand that may require a significant proportion of all the available bandwidth. There may well also be significant additional bandwidth demand over second link 340.

Seventh edge node 317 can only receive an image from central registry 360 if that image passes over several links within the mesh. If any one of those links suffers demand for a significant proportion of its bandwidth, then the operation of seventh edge node 317 will be correspondingly affected.

Figure 4:
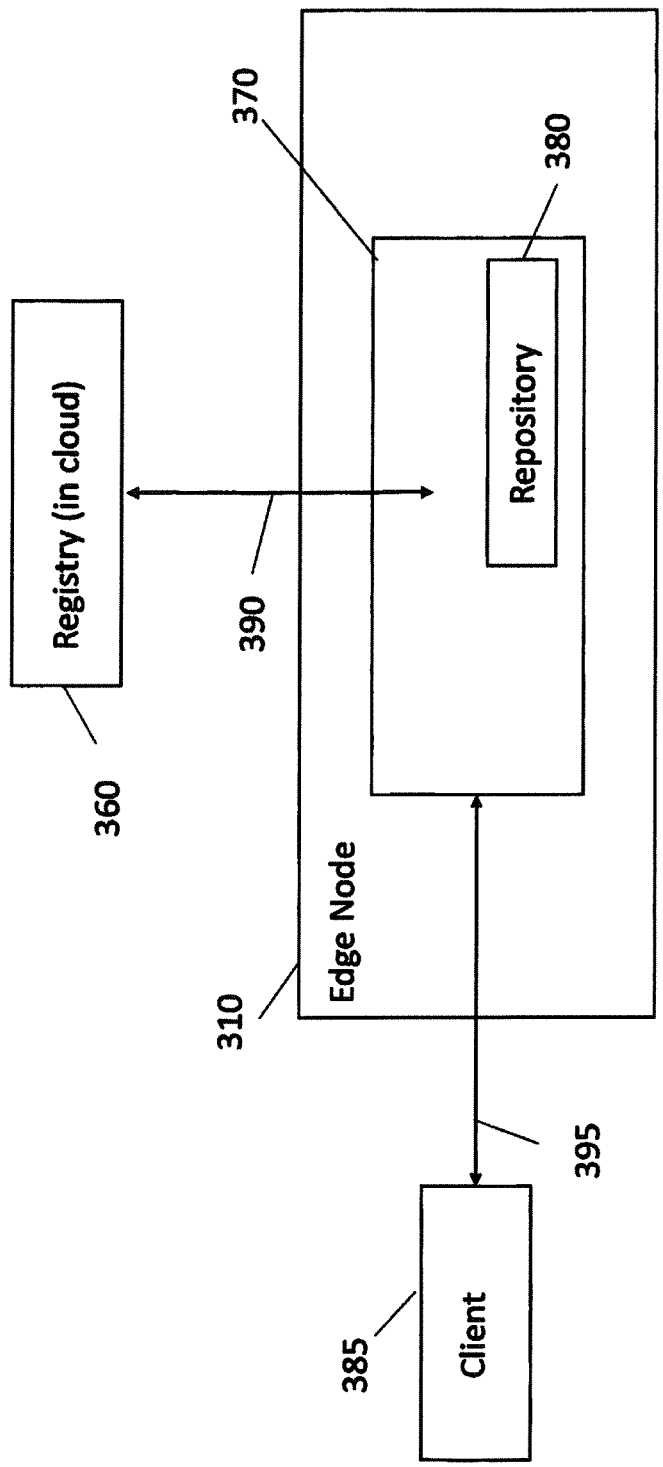
FIG. 4 illustrates the architecture of a known edge node and a host.

FIG. 4 illustrates the architecture of a known edge node and a host. First edge node 310 and central registry 360 correspond to those elements in FIG. 3.

A client 385 is shown connected to first edge node 310 via client link 395. Host 370 is located on first edge node 310. Within host 370, repository 380 acts to store received images. Link 390 provides for communication to and from central registry 360. Host 370 can request images from central registry 360 via link 390, and receive images directly into host 370 from central registry 360 via link 390. Client link 395 provides for communication between client 385 and host 370.

In known systems, host 370 will request an image from central registry 360 when that host 370 needs the image. That need arises when client 385 makes a first request, i.e. for that image. When the image arrives from central registry 360, host 370 places the image in its repository 380. Subsequently, client 385 may make a second request for an image. If host 370 finds that it can meet the second request by supplying one of the images that is already stored in repository 380, then the host 370 supplies the image immediately to client 385. However, if host 370 finds that it cannot meet the second request by supplying one of the images that is already stored in repository 380, then host 370 will request the image from central registry 360.

Considering the mesh computing system 300 of FIG. 3 in more detail, a further issue arises. When a particular image is to be downloaded from central registry 360 to seventh edge node 317, then that image will have to be 'daisy chained' through first edge node 310, second edge node 312, fourth edge node 314 and fifth edge node 315. The download of that image will be in a transmission that is not open to inspection by the intervening first edge node 310, second edge node 312, fourth edge node 314 and fifth edge node 315. Thus bandwidth will be consumed by the download of the image in each of the links between first edge node 310, second edge node 312, fourth edge node 324 and fifth edge node 315, without that consumption of bandwidth providing any advantage to those intervening nodes. The same image may also, at the same time, have been requested separately by the fifth edge node 315, for its own use. In order to download the image from central registry 360 to the fifth edge node 315, the image will also have to be transmitted again from central registry 360 via first edge node 310, second edge node 312, and fourth edge node 314. The result in this situation is that the same image is transferred multiple times through the same links of the mesh computing system 300, possibly simultaneously. This results in high traffic on some links and through some nodes, with the worst affected nodes being those closest to first node 310 and second link 340, the backhaul link. Second link 340 is likely to have the highest load.

Further differences between a mesh computing system and a LAN system can be recognized. If a service is distributed to multiple nodes in the mesh computing system 300, all nodes will use the central registry 360 to obtain an image. When making a request for an image from central registry 360, any edge node in the mesh computing system 300 will then suffer bandwidth demand that takes a significant proportion of its available bandwidth, in dependence on at least: (i) the number of links between that node and central registry 360; (ii) the demands on each link at that instant in time; and (iii) the capacity of each link, which may vary with time. The mesh will be bandwidth restricted to an extent that depends on the technology and the topology, and potentially on interference in the case of wireless links.

A comparison of the mesh computing system 300 of FIG. 3 and the LAN system 200 of FIG. 2 reveals the differences shown in summary in the table below:

TABLE 1

Differences between mesh computing and LAN systems

| Issue | Difference exhibited by mesh computing system 300 over LAN system 200 |
|---|---|
| Architecture-Multiple links | Any image downloaded in mesh computing system 300 will potentially be passed over multiple 'hops' (links) on its way to its destination node, i.e. the host that requests it. The further the host is from the first node 310 and the second link 340, then the larger the number of links that the image must cross. |
| Technology-bandwidth per link | Each of the links in the mesh computing system 300 may be a constrained communication link, for example a cellular link or a Wi-Fi link. |
| Technology-interference | Cellular or Wi-fi links in mesh computing system 300 may suffer interference. |
| Process-simultaneous parallel downloads | When more than one node in the same part of mesh computing system 300 requests the same image at the same time, that image may be downloaded multiple times over the same link, or nearby links, simultaneously. This is not a significant issue within LAN 205 of FIG. 2. |
| Backhaul | The backhaul over second link 340 to the global internet 350 may also be a constrained communication link, for example a cellular link or a Wi-Fi link. This causes a significant bottleneck as the image is downloaded to each host from central registry 360 over this single link. |

In mesh computing system 300 there are a wide variety of different usage scenarios. These different usage scenarios complicate the design of a mesh system that is to demonstrate acceptable bandwidth performance. In particular, in some usage scenarios, not all the edge nodes may require a particular image. There are three different scenarios.

In the first scenario, the image does need to be downloaded to all hosts. This places large bandwidth demands across many or all of the links in mesh computing system 300, simultaneously. In the second scenario, the image needs to be downloaded only to specific hosts, i.e. one or more edge nodes. In the third scenario, the image needs to be downloaded to one or more 'non-specific' hosts. This third scenario may arise when a service is required to run, but it does not matter which particular host in mesh computing system 300 runs the service.

The present invention provides a mesh computing system in which hosts, i.e. edge nodes, can download an image from another host, e.g. a neighbouring host. With this approach, some of the disadvantages of the mesh computing system 300 can be overcome. A reduction in the need to download images from the central registry can thereby be achieved. Various embodiments of the invention, including various methods for achieving the invention, are outlined below.

Figure 5:
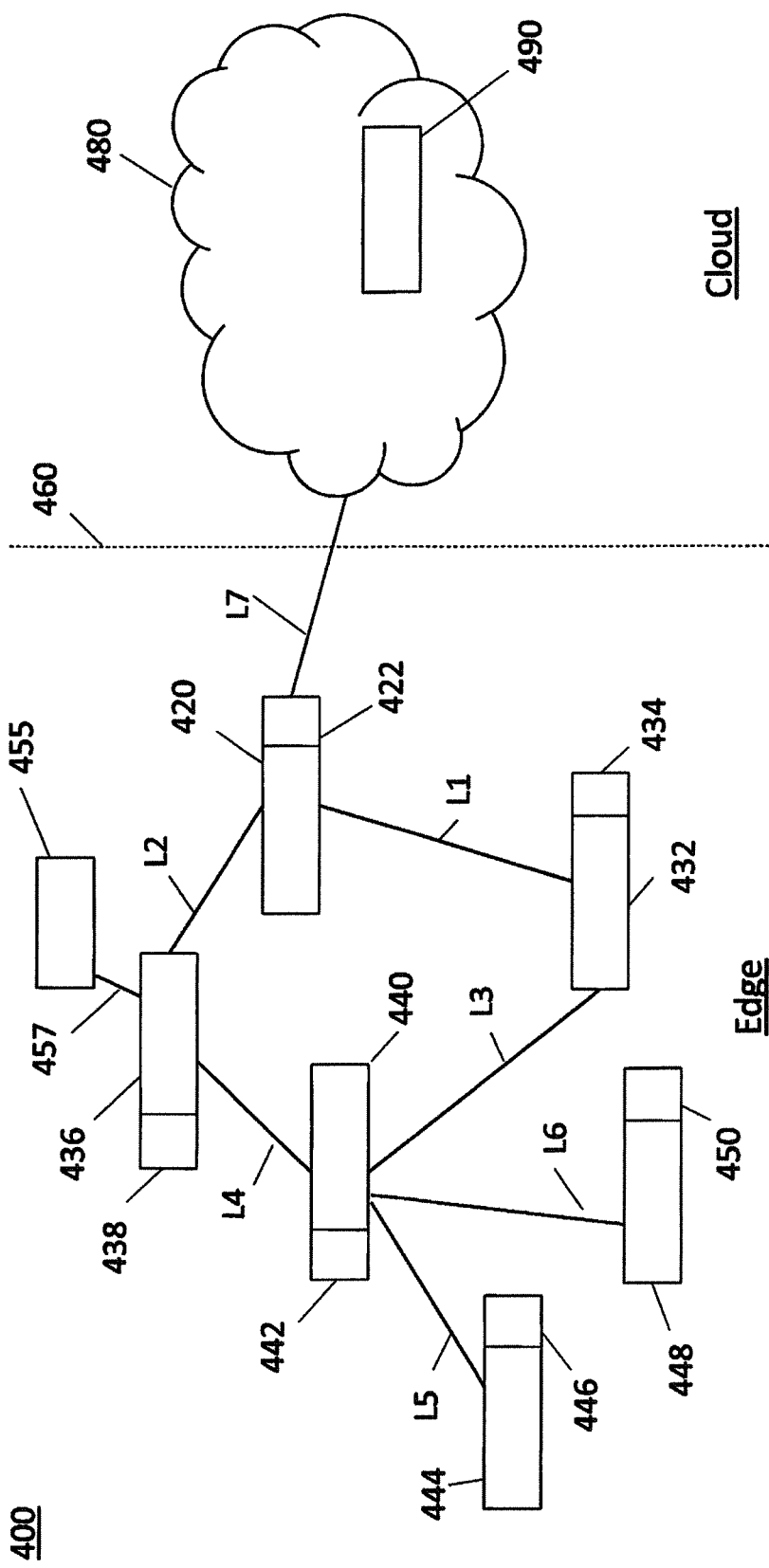
FIG. 5 illustrates the architecture of a mesh computing system in accordance with an embodiment.

FIG. 5 provides a schematic illustration of the architecture of a modified mesh computing system 400 of an embodiment of the invention. In the modified mesh computing system 400, some functions that were previously carried out by the central registry 360 of mesh computing system 300 have been distributed among the hosts in mesh computing system 400. In addition, in accordance with various embodiments of the invention, further functions may now be carried out by the various registries of mesh computing system 400.

Figure 6:
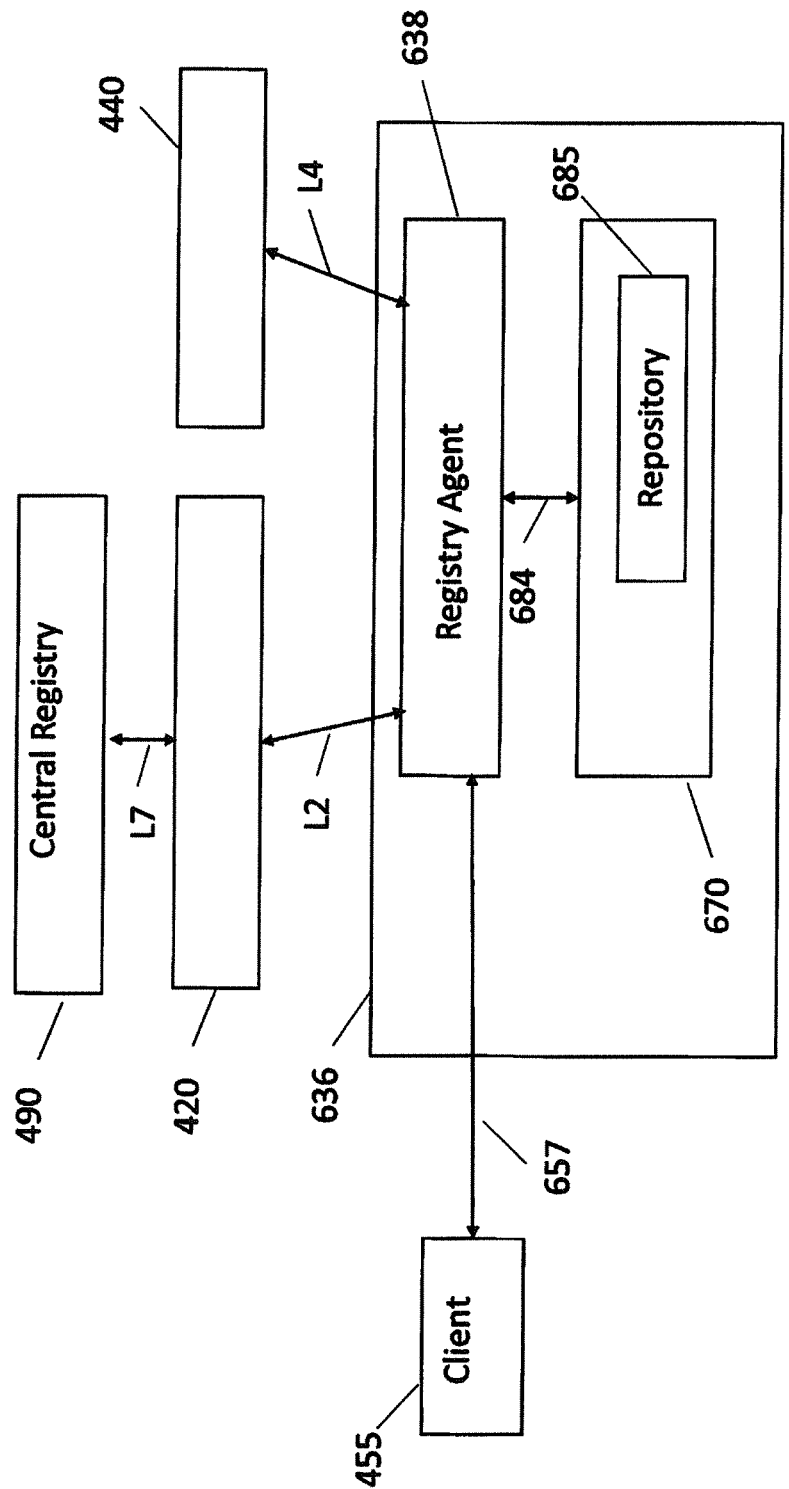
FIG. 6 illustrates an embodiment of an architecture of an edge node, and a host of the embodiment of FIG. 5.
Figure 7:
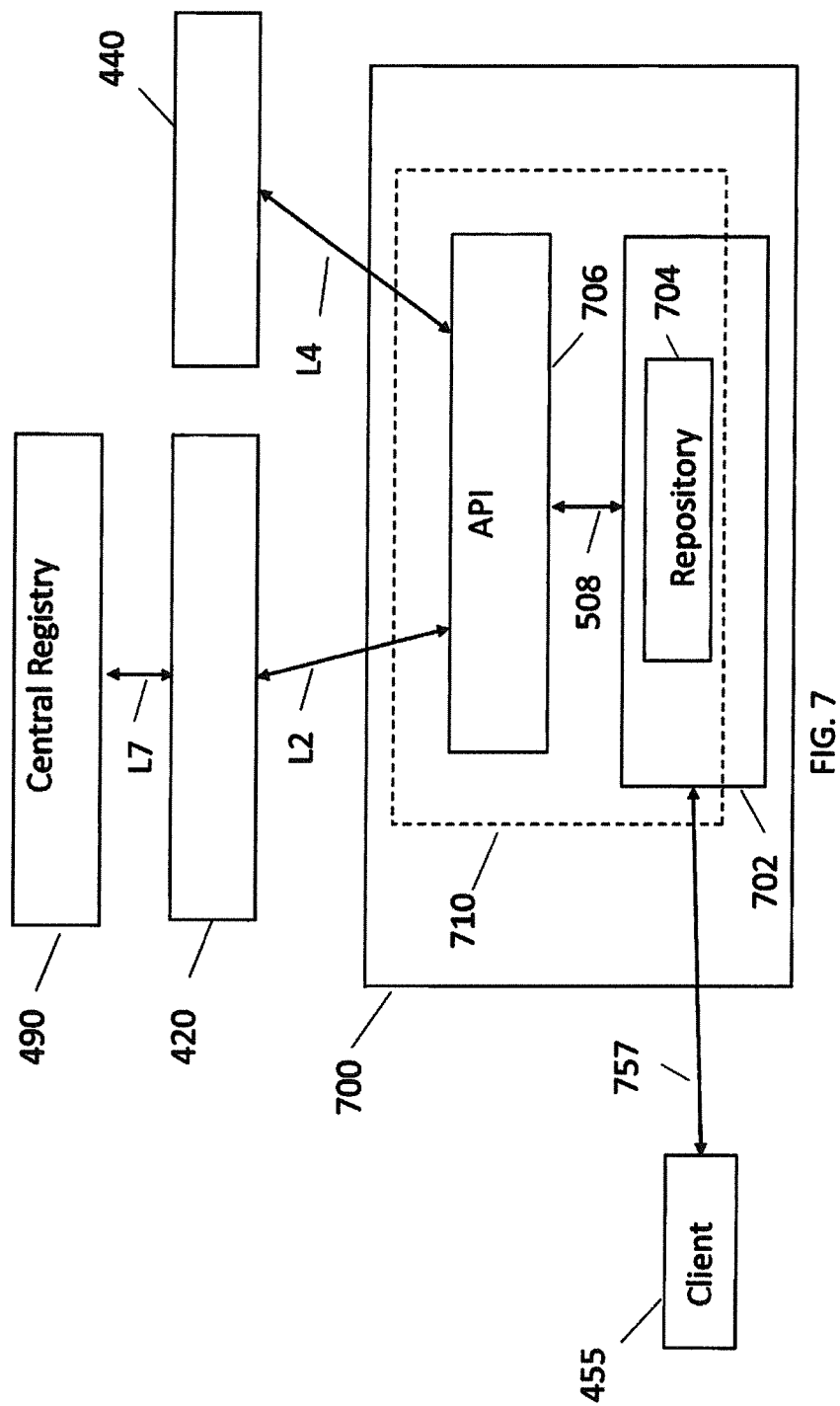
FIG. 7 illustrates another embodiment of an architecture of another edge node and a host of the embodiment of FIG. 5.

The various registry elements described in connection with FIG. 5 are not necessarily identical to central registry 360 of FIG. 3. Each registry element that is co-located with a host may only contain some images, which the host is storing locally. FIGS. 6 and 7 provide illustrative embodiments of two different embodiments of the registry elements that are co-located with the hosts of FIG. 5. After the description below of the structure of mesh computing system 400 of FIG. 5, various ways of operating mesh computing system 400 are described with reference to FIGS. 9-14 and 16.

In mesh computing system 400, some links have significant bandwidth constraints. Mesh computing system 400 is illustrated as comprising six edge nodes, each of which is home to a host. Each edge node may, in a practical embodiment, be located on a server that is connected by wireless links to other nodes.

Mesh computing system 400 comprises first edge node 420. First registry element 422 is provided within first edge node 420. In an alternative arrangement that is not shown in FIG. 4, first registry element 422 could be outside first edge node 420, but connected to first edge node 420 by a link. That link would be a high bandwidth link. First registry element 422 carries out functions that are outlined in greater detail in the discussion of the operation of mesh computing system 400 below, and in connection with FIGS. 6 and 7.

Second edge node 432 comprises second registry element 434. Third edge node 436 comprises third registry element 438. Fourth edge node 440 comprises fourth registry element 442. Fifth edge node 444 comprises fifth registry element 446. Sixth edge node 448 comprises sixth registry element 450.

In alternative arrangements that are not shown in FIG. 5, any of second registry element 434, third registry element 438, fourth registry element 442, fifth registry element 446 or sixth registry element 450 could be outside of the edge nodes of which they currently form part, and could be connected to their edge node by a high bandwidth link. The edge nodes are located in a portion of FIG. 5 that is generally labelled as the 'Edge', and which lies to the left of dividing line 460.

First edge link L1 connects first edge node 420 and second edge node 432. Second edge link L2 connects first edge node 420 and third edge node 436. Third edge link L3 connects second edge node 432 and fourth edge node 442. Fourth edge link L4 connects third edge node 436 and fourth edge node 440. Fifth edge link L5 connects fourth edge node 440 and fifth edge node 444. Sixth edge link L6 connects fourth edge node 440 and sixth edge node 448.

First edge node 420 is also connected via seventh edge link L7 to global internet 480. Global internet 480 is located in a portion of FIG. 5 that is generally labelled as the 'Cloud', and which lies to the right of dividing line 460.

Located within global internet 480 is central registry element 490. Central registry element 490 may correspond to Docker™ Registry element 120 in FIG. 1. Seventh link L7 may take the form of a backhaul link. Central registry element 490 is on a server in global internet 480.

Client 455 is shown directly linked to third edge node 436 by client link 457. Client 455 is located on a separate server. However, client 455 could be on the same server as third edge node 436. Alternatively, client 455 could be located on the same server as any of the other nodes or could be located on a server in global internet 480.

The registry elements shown in FIG. 5 may not be identical, and do not all hold all of the images held in registry element 360 of the 'centralised' mesh computing system 300 of FIG. claim 3. Each of the first to sixth registry elements shown in FIG. 5 only contains those images that are being stored by the host with which the registry element is associated.

FIG. 6 illustrates an architecture of an edge node and a host of the embodiment of FIG. 5. Client 455 and central registry 490 correspond to those elements in FIG. 5.

Third edge node 636 is of different construction to third edge node 436 in FIG. 4. Host 670 is located on third edge node 636. The registry agent 638 is also located on third edge node 636. Client link 657 provides for communication between client 455 and registry agent 638 of host 670. Within host 670, repository 685 acts to store received images, i.e. images that have been received at host 670.

In the embodiment of FIG. 6, host 670 communicates with registry agent 638 via internal link 684 within third edge node 636. Registry agent 638 communicates with: (i) First edge node 420, via external link L2; (ii) Central registry 490, via external links L2 and L7; and (iii) Fourth edge node 440, via external link L4. Registry agent 638 enables the host 670 to receive images into repository 685 and to supply images from repository 685. The presence of registry agent 638 enables functionality described below with reference to FIGS. 9-12.

FIG. 7 illustrates another embodiment of an architecture of an edge node and a host of the embodiment of FIG. 5. The embodiment of FIG. 7 is an alternative to the embodiment shown in FIG. 6. FIG. 7 shows third edge node 700.

In FIG. 7, central registry 490, second edge node 420, fourth edge node 440 and client 455 correspond to those elements in FIG. 6. Likewise, links L2, L4 and L7 in FIG. 7 correspond to those links in FIG. 6. Client 455 is linked by client link 757 to host 702.

In FIG. 7, the registry element 738 of FIG. 5 now takes the form of a Local Registry 710 located on third edge node 700. The Local Registry 710 differs in structure and function over the Registry Agent 638 of FIG. 6.

Local Registry 710 comprises an Application Programming Interface (API) 706, which is absent from Registry Agent 638 of FIG. 6. Local Registry 710 also comprises a repository 704, located on host 702. The dotted line in FIG. 7 that encompasses both API 706 and repository 704 shows them as part of Local Registry 710. Local Registry 710 may have equivalent functionality to central registry 490 of FIG. 4. In this case, repository 704 may hold a comprehensive database of images, which is as extensive as that held in central registry 490.

In one exemplary embodiment, all the registry elements in mesh computing system 400 may take the form of Registry Agent 638 of FIG. 6. In another exemplary embodiment, all the registry elements in mesh computing system 400 may comprise take the form of Local Registry 710 of FIG. 7. In a further exemplary embodiment, some of the registry elements in mesh computing system 400 may take the form of Registry Agent 638 of FIG. 6, whilst other registry elements in mesh computing system 400 take the form of Local Registry 710 of FIG. 7.

In a typical configuration of the invention, many nodes in mesh computing system 400 will be configured as shown for host 670 and registry agent 638 of in FIG. 6. A smaller number of nodes will be configured as shown for host 702 and local registry 710 in FIG. 7.

In operation, mesh computing system 400 of FIG. 5 is able to provide images from central repository 490, and also offers options for the supply of images that are already held by the hosts of the mesh computing system 400 itself.

Registry agent 638 of FIG. 6 provides the functionality necessary to carry out one method in accordance with the invention. When host 670 receives a command to download a particular image, the host carries out a discovery process to decide from where the host can obtain the particular image. Each host is able to discover which of the neighbouring hosts already has the particular image, i.e. which of the neighbouring hosts has already downloaded the image and holds it in its repository.

This method can be accomplished by using a service discovery method to find a repository at any host that already has the particular image. This host is, preferably, close to a host 670 that is requesting an image. This can be viewed as a "repository as a service" function provided by the hosts themselves. As part of the service, a cost metric can be calculated. The cost metric indicates the resources that would be required to download a sought image to the requesting host, from any particular neighbouring host.

Figure 8:
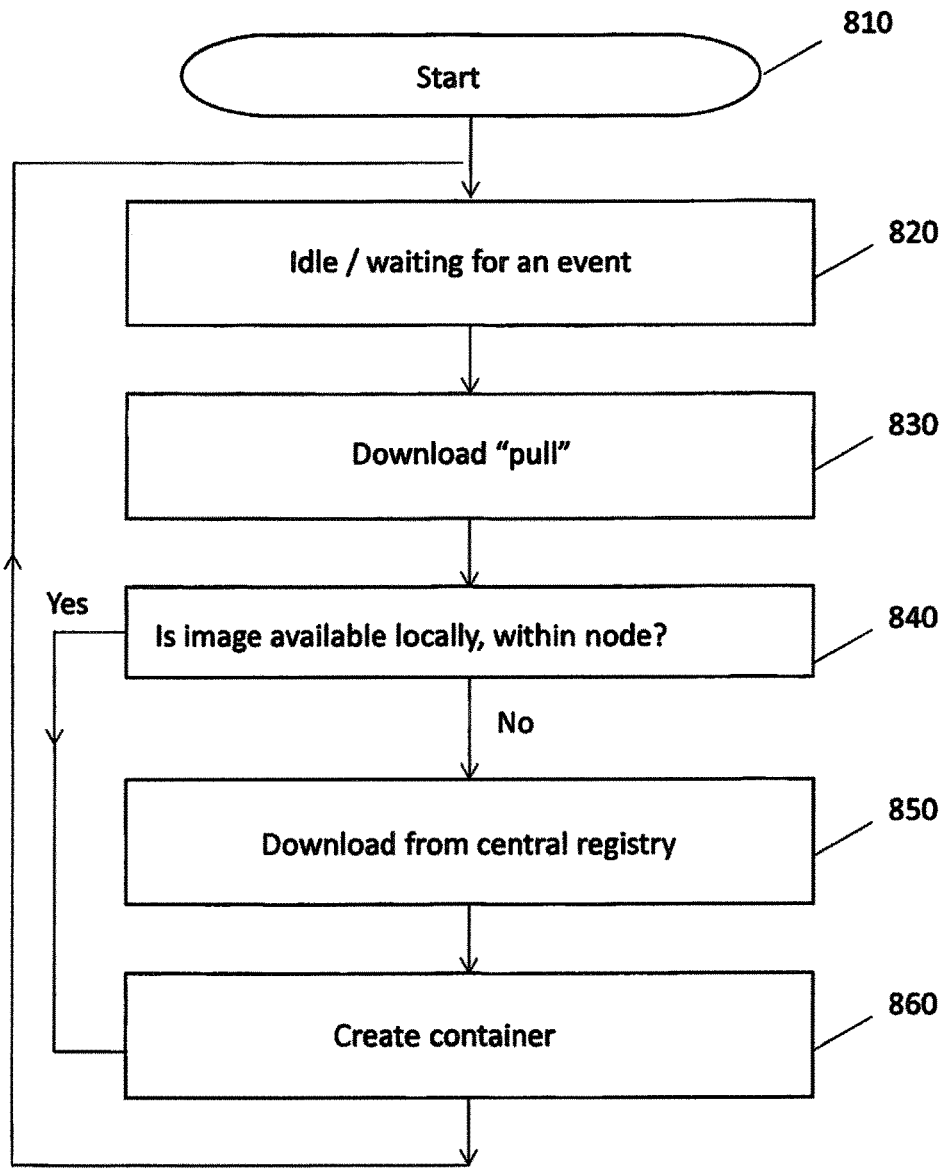
FIG. 8 is a flow diagram of a method of operation of the known mesh computing system of FIG. 3.

Before discussing the method of operation of the mesh computing system of FIG. 5 and the edge nodes and hosts of FIGS. 6 and 7, FIG. 8 provides an explanation of how the known system of FIG. 3 operates.

FIG. 8 is a flow diagram of a method of operation of the mesh computing system of FIG. 3. FIG. 8 allows a clear comparison with the embodiments of the method of the invention that are described subsequently with reference to FIGS. 9-13.

FIG. 8 illustrates a flow diagram for a method of image download as would occur on mesh computing system 300 in FIG. 3. Method 800 is a method that would be used if containerization were implemented on mesh computing system 300 without using the invention. The references used in the discussion of method 800, below, are from FIG. 4.

Method 800 starts at step 810. At 820, the host 370 at edge node 310 is idling, i.e. waiting for an event. At step 830, client 385 has requested an image, which results in the generation of a command to 'pull' the image.

In step 840, host 370 ascertains whether the image is already held locally in the repository 380 of the host 370 itself. If the answer is 'No', then host 370 has to download the image from Central Registry 360 of FIG. 3. Then method 800 moves to step 860. If the answer is 'Yes' in response to the question in step 840, then the method bypasses step 850 and moves directly to step 860. At step 860, host 370 uses the image to create a container, in order to address the request from client 385. After step 860, method 800 returns to idle at step 820 until a new request is received from a client.

Figure 9:
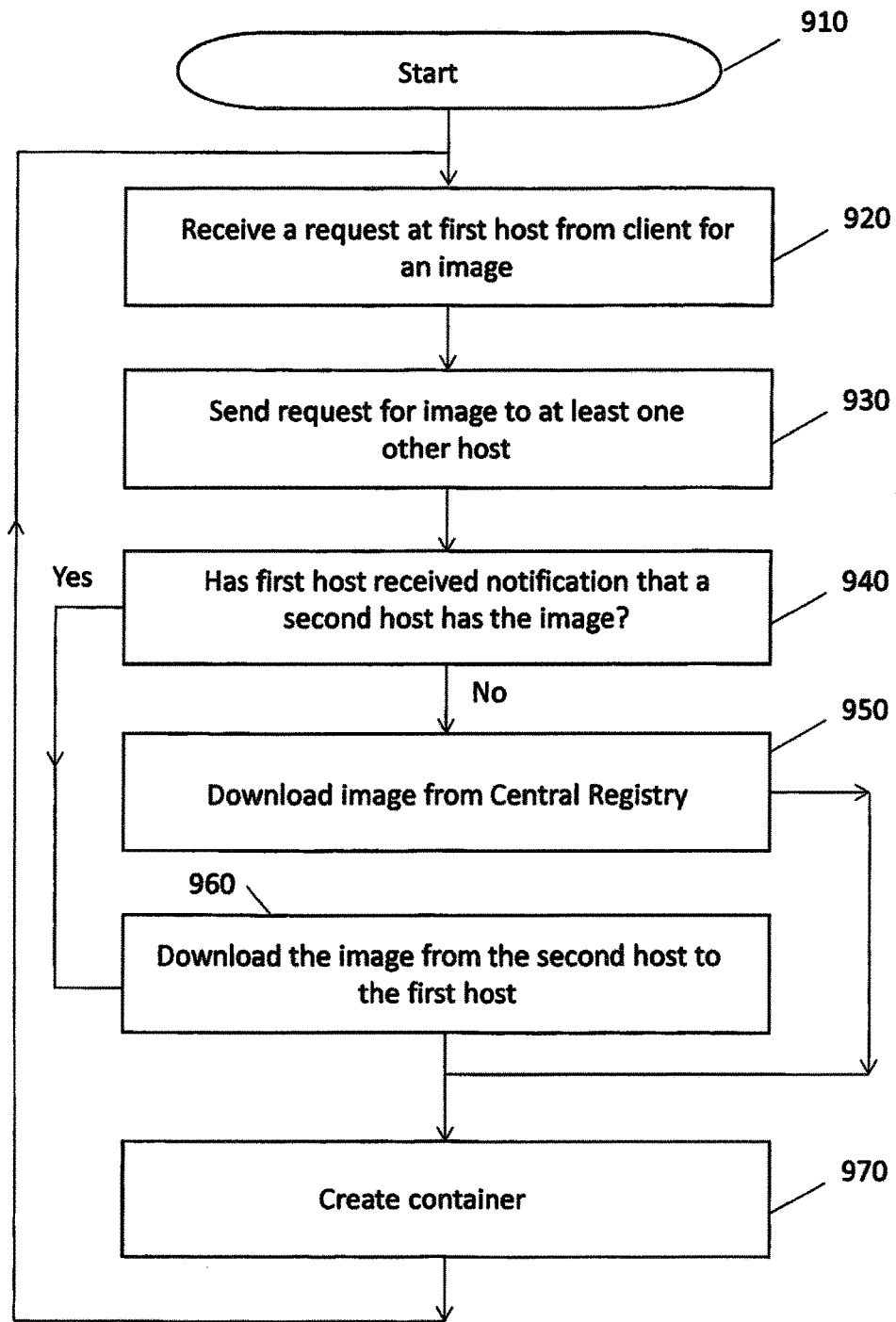
FIG. 9 provides an illustration of a method of operation of a mesh computing system in accordance with an embodiment of the invention.

FIG. 9 is a flow diagram of a method of operation of the mesh computing system of FIG. 5, with reference to first host 470 and registry agent 438 of FIG. 6

Method 900 begins at step 910. At step 920, the first host 910 receives a request from client 455 for an image. At step 930, the first host 910 sends a request for the image to at least one other host of the mesh computing system 400.

When the first host 910 receives 940 notification that at least a second host holds the image, method 900 moves to step 960. At step 960, the first host 910 downloads the image from the second host to the first host 910. However, when the first host 910 does not receive 940 notification that at least a second host holds the image, method 900 moves to step 950. At step 950, the first host 910 downloads the image from the central registry 490 to the first host 910. After either step 950 or 960, host 470 creates 970 a container from the downloaded image.

With the method of FIG. 9 and the registry agent 438 in FIG. 6, the first host 470 may be able to reduce substantially the number of requests that it makes for images from central registry 490. Many requests from clients for images will be met by implementing step 960, i.e. downloading the image from another host in the mesh network 400. Downloading the image from another host in the mesh network 400 reduces traffic in the mesh network 400. When the image is downloaded from another host to first host 470, there will be no request to central registry 490 and hence there is a reduction in traffic on seventh link L7, which is the backhaul link.

Figure 10:
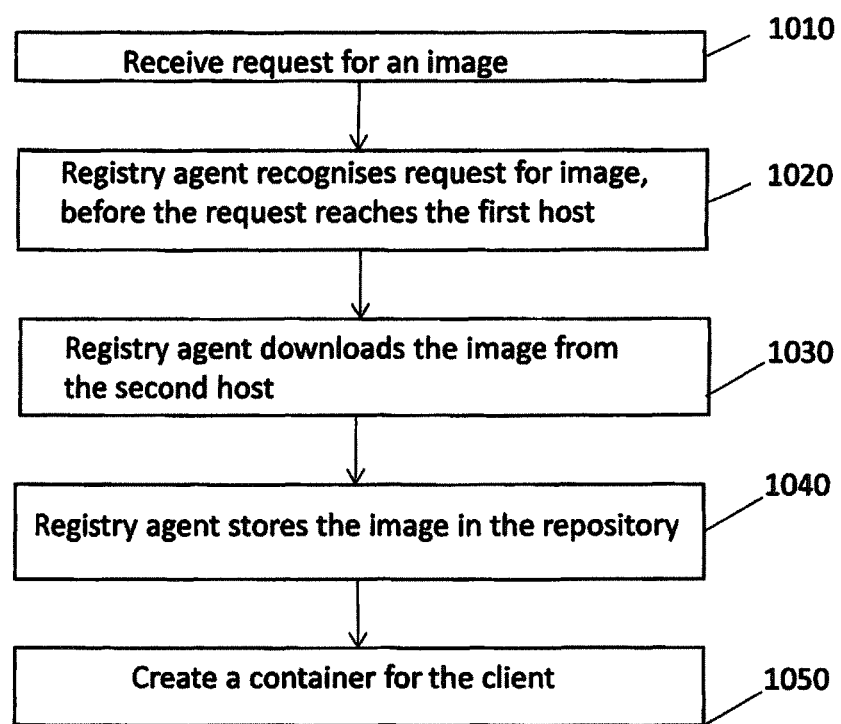
FIG. 10 provides an illustration of a method of operation a registry agent in accordance with an embodiment of the invention.
Figure 11:
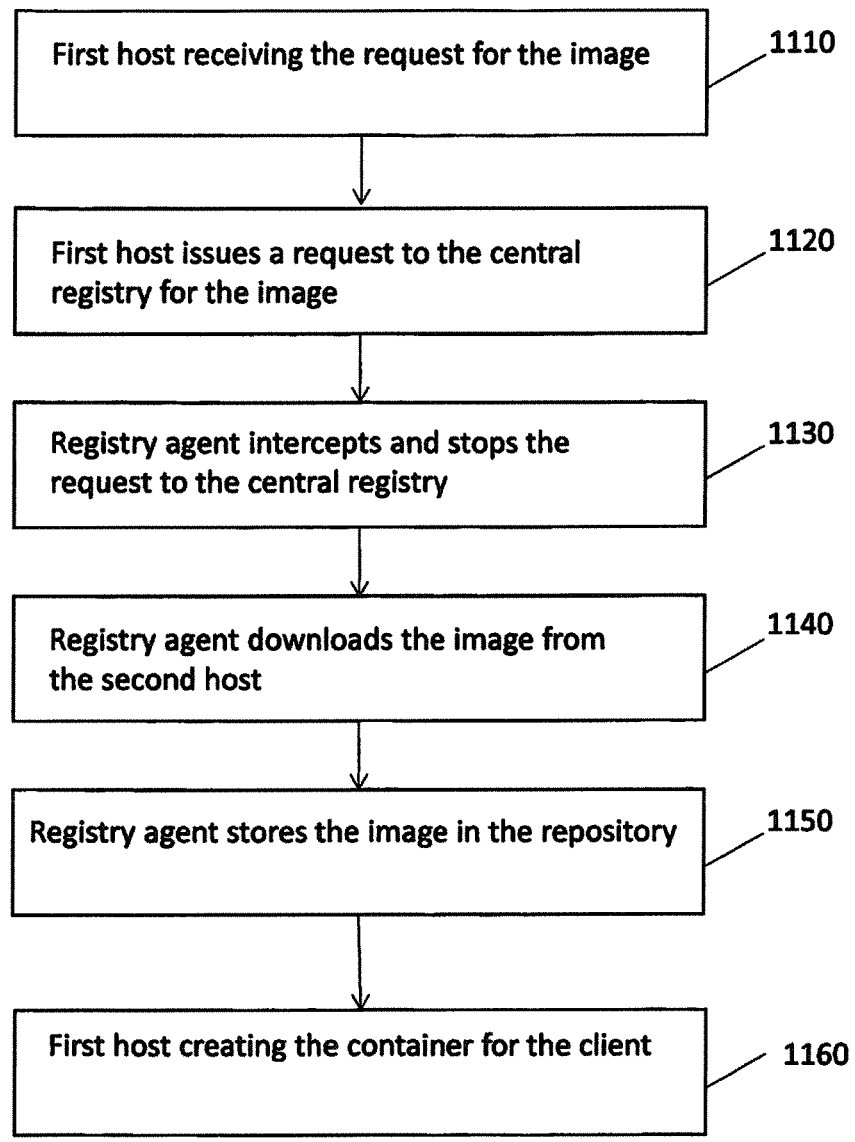
FIG. 11 is a flow diagram of a method of operation of a registry agent in accordance with an embodiment of the invention.

FIG. 10 is a flow diagram of a first method of operation of registry agent 638 of FIG. 6, when performing the method 900 of FIG. 9. FIG. 11 is a flow diagram of a second method of operation of registry agent 438 of FIG. 6, when performing the method 900 of FIG. 9.

FIG. 10 is a flow diagram of a method 1000. At step 1010, the registry agent 638 receives a request from the client for an image. At step 1020, the registry agent 638 recognises the request for the image, before the request reaches the first host. At step 1030, the registry agent 638 downloads the image from the second host.

At step 1040, the registry agent 638 stores the image in the repository 685. Then, at step 1050, the registry agent 638 creates a container for the client from the downloaded image.

FIG. 11 is a flow diagram of a method 1100. At step 1110, the registry agent 638 receives the request for the image from the client 455. At step 1120, the first host issues a request to the central registry 490 for the image. At step 1130, the registry agent 638 intercepts and stops the request to the central registry 490.

At step 1140, the registry agent 638 downloads the image from the second host 420. At step 1150, the registry agent 638 stores the image in the repository 685. At step 1160, the first host creates the container for the client 455.

At step 1030 or step 1140, the registry agent 638 may download the image from a repository in a second host 420. However, alternatively, at step 1030 or step 1140, the first host may request the image from an API of the second host and download the image from a registry of the second host. In this case, the second host will have enhanced functionality over a second host 420 that only comprises a repository.

Figure 12:
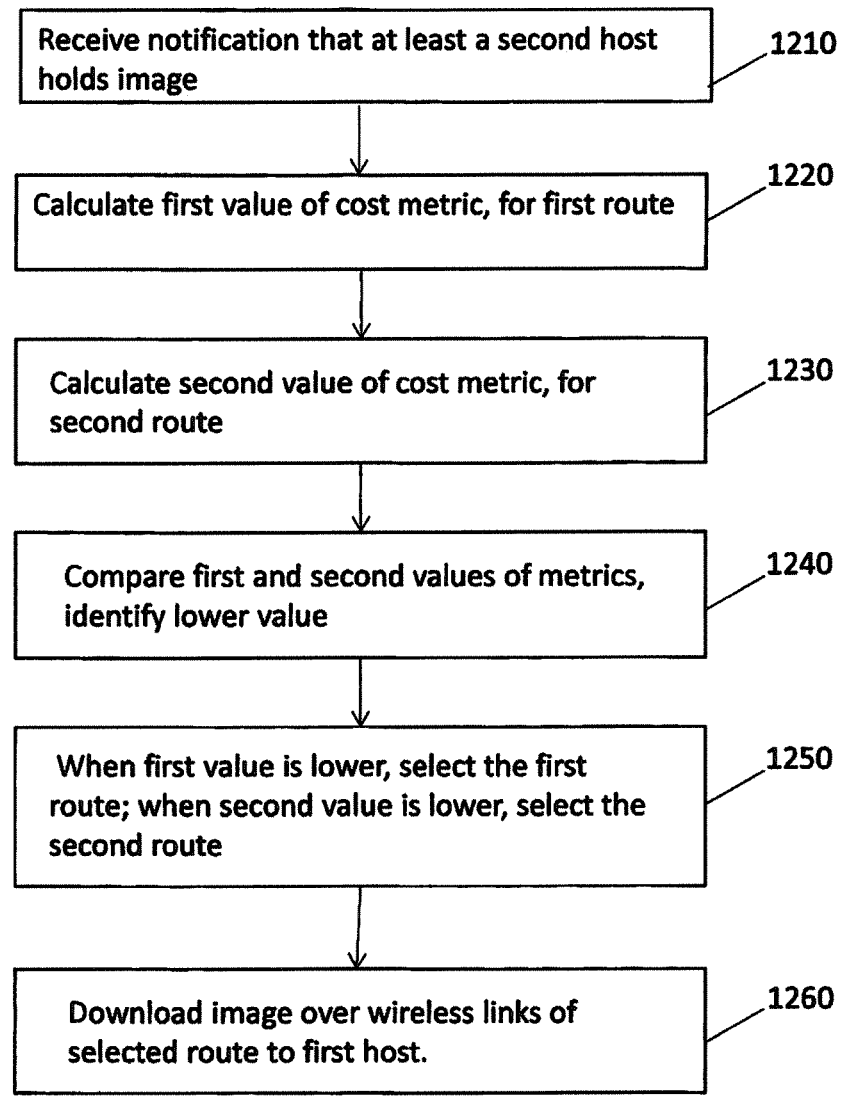
FIG. 12 is a flow diagram of a method of downloading an image in accordance with an embodiment of the invention.

FIG. 12 is a flow diagram of a method 1200 of downloading an image that may be comprised in step 960 of method 900.

At step 1210, the first host receives notification that at least a second host holds the image. At step 1220, the first host calculates a first value of a cost metric, for a first route over which the image could be downloaded to the first host. At step 1230, the first host calculates a second value of the cost metric, for a second route over which the image could be downloaded to the first host.

At step 1240, the first host compares the first value of the cost metric and the second value of the cost metric, to identify the lower of the first value of the cost metric and the second value of the cost metric. At step 1250, when the first value of the cost metric is lower, the host selects the first route. However, when the second value of the cost metric is lower, the host selects the second route. At step 1260, the host downloads the image over wireless links of the selected route to the first host.

FIG. 13 is a flow diagram of a method 1300 of making the calculation in step 1220 or step 1230 of method 1200.

Method 1300 evaluates a situation where each of the first route and the second route comprises one or more wireless links. At step 1310, for each route, the cost metric calculation uses at least one of the following parameters: (i) a number of links over which the image must be transmitted; (ii) a communication link quality of each of the links; (iii) a loading on any intermediate edge nodes on the route that would result from downloading the image; (iv) a loading of each link; and/or (v) a financial cost of transmitting on each link.

At step 1320, when a route comprises two or more links, the cost metric is calculated in accordance with any of (i), (ii) or (iv) by evaluating the parameter for each link in the route; and combining the evaluated parameters for each link in the route to calculate a total cost metric for the route.

Method 1300 is illustrated for a situation where two routes, for example, start at the same second node. For the sake of completeness, the method 1300 can also be applied when the same desired image is available at both a second host and a third host of the other hosts. In this case, when at least a second host and a third host holds the image, method 1300 calculates: (i) the first value of the cost metric, for a first route over which the image could be downloaded to the first host from the second host; and (ii) the second value of the cost metric, for a second route over which the image could be downloaded to the first host from the third host. When the first value of the cost metric is lower, method 1300 selects the second host to provide the image over the first route. When the second value of the cost metric is lower, method 1300 selects the third host to provide the image over the second route.

Figure 14:
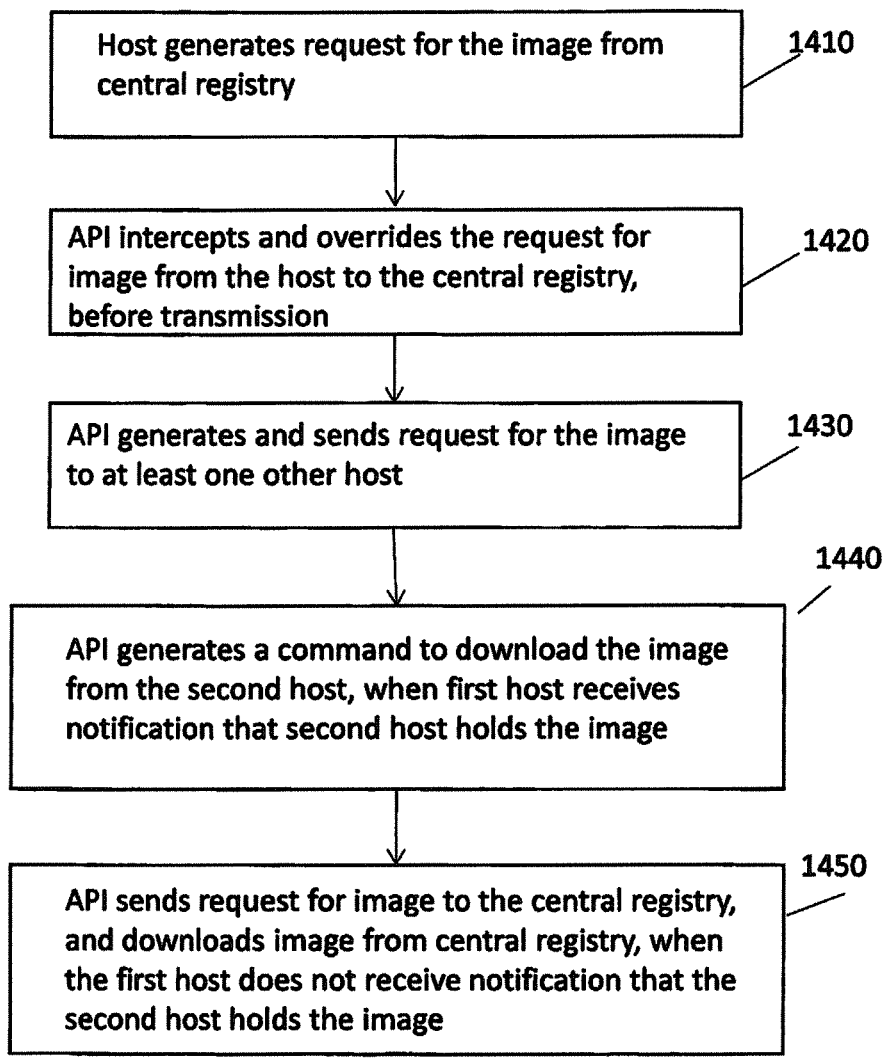
FIG. 14 illustrates a method in accordance with an embodiment.

Method 1100 described a method in which, at steps 1120 and 1130, the first host issues a request to the central registry for the image, but registry agent 638 intercepts and stops the request to the central registry 490. FIG. 14 provides more detail of steps 1120 and 1130 of method 1100.

FIG. 14 illustrates a method in accordance with an embodiment. Method 1400 should be read in conjunction with FIG. 7. At step 1410, in response to receiving the request to run the image, host 702 generates a request for the image from central registry 490.

At step 1420, API 706 intercepts and overrides the request for the image from central registry 490, before transmission of the request for the image. At step 1430, API 706 generates and sends the request for the image to at least one other host of the mesh computing system.

At step 1440, when the first host receives notification that the second host holds the image, the API 706 generates a command to download the image from the second host.

At step 1450, when the first host does not receive notification that the second host holds the image. The API sends a request for the image to the central registry, and downloads the image from the central registry. Step 1450 is the alternative to that shown in step 1440.

Steps 1420, 1430 and 1440 of method 1400 may be implemented by a plug-in software module of the host. Such a plug-in software module would provide programming steps for a logic module of API 706 to perform the steps of: (i) intercepting and overriding the request for the image from the host 702 to the central registry 490; (ii) generating the request for the image, from the at least one other host; and (iii) generating the command to download the image from the second host.

In step 1440 of method 1400, and in other embodiments of the invention, the host 702 may receive the image from the second host using tape archive (tar) or file transfer protocol (ftp). Following step 1440 of method 1400, the host 702 may store the image in the repository 704 of host 702.

Subsequently to performing method 1400, host 702 may receive a request via API 706 from another host in the mesh network, for the image that is now stored in the repository 704 of host 702. API 706 can respond to a pull command from another host in the mesh network by subsequently accessing the image from repository 704 via an API pull command, and supplying the image to the requesting host.

Figure 15:
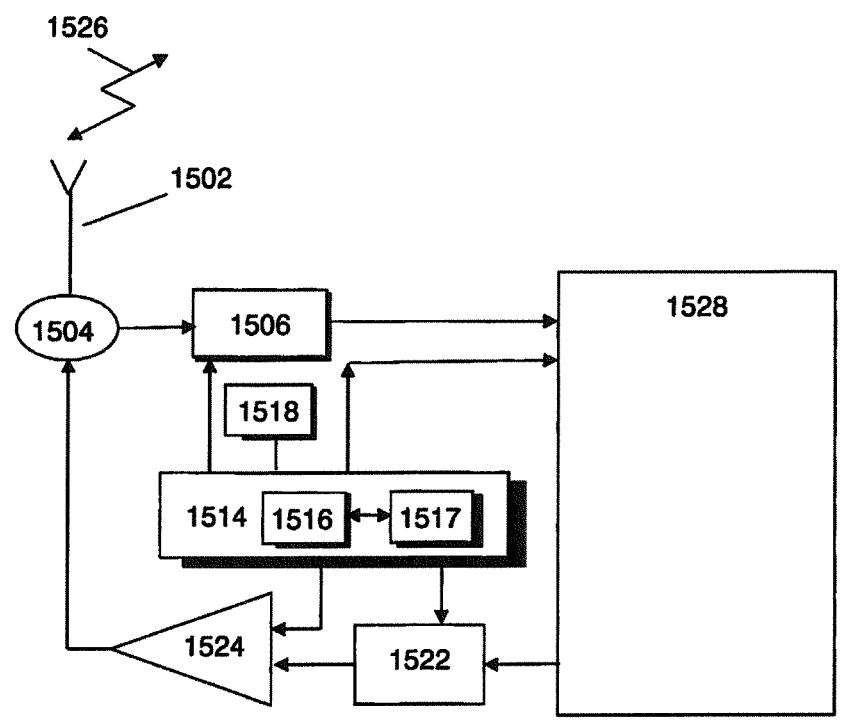
FIG. 15 illustrates an embodiment of a server of the edge node of the invention.

FIG. 15 illustrates an embodiment of a server 1400 of the edge node of the mesh computing system of FIG. 4.

An antenna 1502, for receiving/transmitting cellular transmissions 1522, is provided. Transmission 1526 may, for example, be a WiFi™ or an LTE transmission to another edge node. The antenna 1502 is coupled to an antenna switch or duplexer 1504, which provides isolation between receive and transmit chains. One or more receiver chains, as known in the art, include receiver front-end circuitry 1506. Receiver front-end circuitry 1506 provides reception, filtering and intermediate or base-band frequency conversion. Receiver front-end circuitry 1506 is coupled to a signal processor 1528, which may be realized by a digital signal processor (DSP).

A controller 1514 maintains overall operational control of the server 1500. Controller 1514 is coupled to receiver front-end circuitry 1506 and signal processor 1528. In some examples, the controller 1514 is also coupled to at least one memory, such as random access memory 1517 configured to store data content, and to a memory device 1516. Memory device 1516 selectively stores operating regimes, such as decoding/encoding functions, synchronization patterns, code sequences, and the like. A timer 1518 is operably coupled to the controller 1514 to control the timing of operations, such as transmission or reception of time-dependent signals, within server 1500.

As regards the transmit chain, the signal processor 1528 may process and formulate data for transmission to transmitter/modulation circuitry 1522 and thereafter a power amplifier 1524 and on to the antenna 1502 for transmitting the data. The transmitter/modulation circuitry 1522 and the power amplifier 1524 are operationally responsive to the controller 1514.

In accordance with example embodiments, signal processor 1528 of server 1500 has been configured to support WiFi™ operation. The various components within server 1500 can be realized in discrete or integrated component form, with an ultimate structure therefore being an application-specific or design selection.

In accordance with some example embodiments, the receiver 1506 of the server 1500 may be configured to receive signals via antenna 1502 and store data content when connected to other edge nodes, for example, or an Internet Protocol network. Server 1500 may also be configured to transmit retrieved data content to one or multiple mobile wireless communication units of mesh computing system 400, via antenna 1502, for example by WiFi. The at least one memory 1516, operably coupled to the at least one receiver 1506, may be configured to store the received data content from other edge nodes and/or the mobile wireless communication units.

Figure 16:
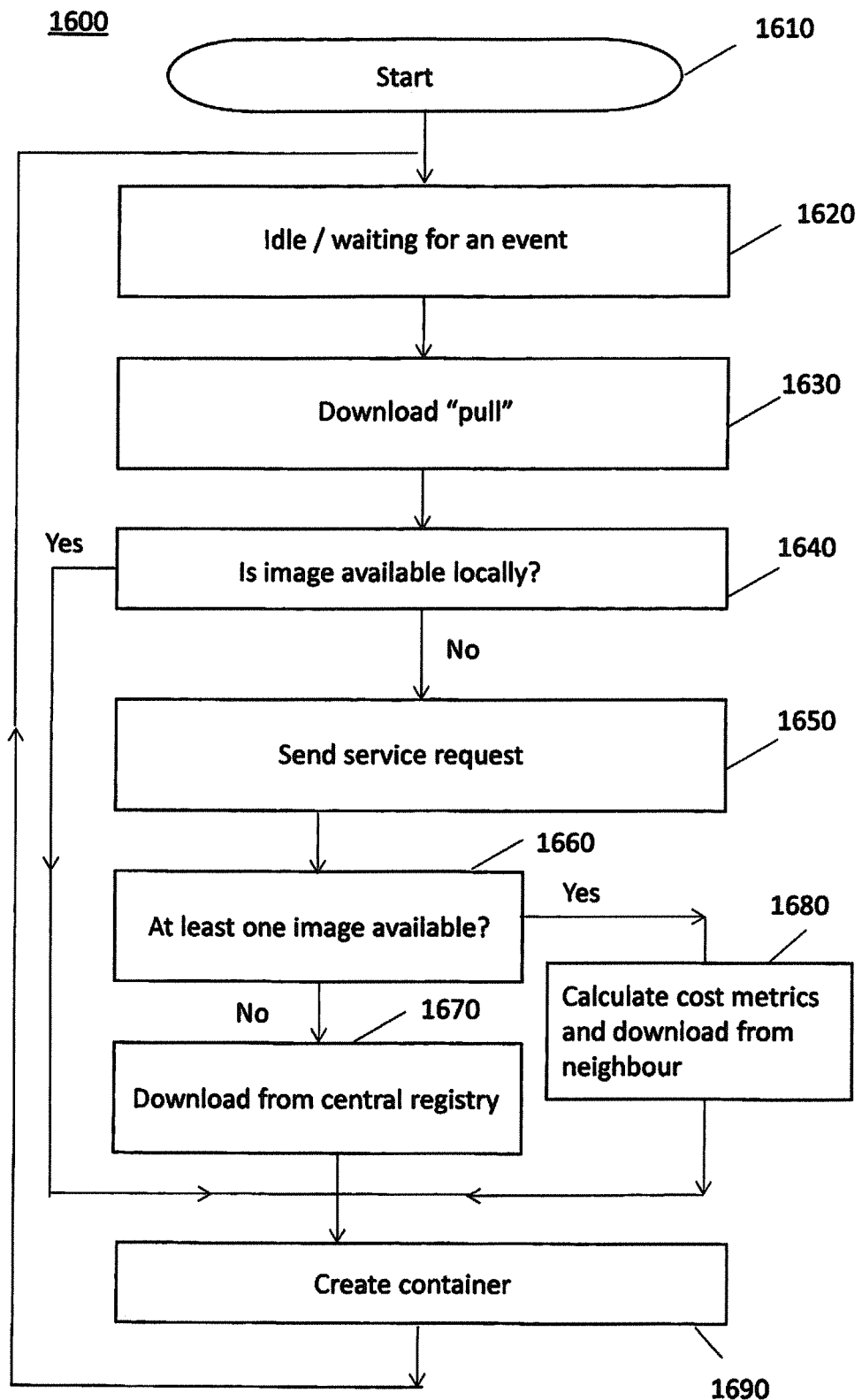
FIG. 16 illustrates a high level overview of a method of operation of an embodiment of the invention.

FIG. 16 illustrates a high level overview of a method of operation of an embodiment of the invention.

Method 1600 illustrates an embodiment where a swarm leader instigates supply of an image to a client, rather than a node supplying an image directly in response to a request received at the node from a client. Method 1600 starts at step 1610. At 1620, a host 670 or 702 at a node 636 or 700 of the mesh computing system is in an idle or waiting mode. At step 1630, the host receives a 'pull' command. The 'pull' command may be issued by a swarm leader within the mesh computing system. The swarm leader may control a plurality of nodes it the mesh computing system.

At step 1640, a check is made whether the image is already available in the registry of the host. If the image is available, method 1600 moves to step 1690. At step 1690, a container is made from the image. The container is then supplied to a requesting host.

If, at step 1640, the image is not available, then method 1600 moves to step 1650. At step 1650, the host send a service request. At step 1660, a decision is made whether the image is available from at least one other host. If the image is available, the method moves to step 1680. At step 1680, cost metrics are calculated for the routes over which the image could be downloaded. Then method 1600 moves to step 1690.

At step 1660, if the image is not available, the method moves to step 1670. At step 1670, the host downloads the image from the central registry 490, and moves to step 1680.

As is clear from the preceding methods and apparatus, the invention provides options for retrieving images from particular nodes within a mesh computing system. In comparison with known approaches, the overall traffic within the mesh computing system may be reduced. In particular, the traffic over links such as backhaul link L7 to the central registry 490 will be lower when the invention is employed.

It will be further appreciated that, for clarity purposes, the described embodiments of the invention with reference to different functional units and processors may be modified or re-configured with any suitable distribution of functionality between different functional units or processors, without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Aspects of the invention may be implemented in any suitable form including hardware, software, firmware or any combination of these. The invention may optionally be implemented, at least partly, as computer software running on one or more data processors and/or digital signal processors. For example, the software may reside on non-transitory computer program product comprising executable program code to increase coverage in a wireless communication system.

Thus, the elements and components of an embodiment of the invention may be physically, functionally and logically implemented in any suitable way. Indeed, the functionality may be implemented in a single unit, in a plurality of units or as part of other functional units. Those skilled in the art will recognize that the functional blocks and/or logic elements herein described may be implemented in an integrated circuit for incorporation into one or more of the communication units.

Furthermore, it is intended that boundaries between logic blocks are merely illustrative and that alternative embodiments may merge logic blocks or circuit elements or impose an alternate composition of functionality upon various logic blocks or circuit elements. It is further intended that the edge computing system and its elements depicted herein are merely exemplary, and that in fact many other edge computing systems and elements or architectures can be implemented that achieve the same functionality.

Although the present invention has been described in connection with some example embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

What is claimed is:

1. A method of traffic reduction in a mesh bandwidth-constrained wireless computing system operably coupled to a central registry holding images, the mesh bandwidth-constrained wireless computing system comprising hosts located on edge nodes of the mesh bandwidth-constrained wireless computing system and configured to create containers from the images, the method comprising, at a first host located at a first edge node of the mesh bandwidth-constrained wireless computing system:

receiving a request from a client for an image;
sending a request for the image to at least one other host of the mesh bandwidth-constrained wireless computing system;
when the first host receives notification that at least a second host holds the image, the first host performs:
calculating a first value of a cost metric that indicates resources required to download the image, for a first route over which the image could be downloaded to the first host;
calculating a second value of the cost metric for a second route over which the image could be downloaded to the first host;
comparing the first value of the cost metric and the second value of the cost metric, to identify a lower of the first value of the cost metric and the second value of the cost metric;
selecting the first route when the first value of the cost metric is lower or selecting the second route when the second value of the cost metric is lower;
downloading the image over at least one wireless link of the selected route from the second host to the first host; and
when the first host does not receive notification that at least a second host holds the image, downloading the image from the central registry to the first host; and
creating a container from the image.

2. The method according to claim 1, wherein the first host comprises a registry agent; the method further comprising, at the registry agent:
receiving a request from the client for the image;
recognizing the request for the image, before the request reaches the first host;
downloading the image from the second host, and
storing the image in a repository of the first host.

3. The method according to claim 2, wherein the second host comprises an Application Programming Interface, API, and a registry, the method further comprising, at the first host:
requesting the image from the API of the second host, and
downloading the image from a registry of the second host.

4. The method according to claim 1 wherein the first host comprises a local registry comprising an Application Programming Interface, API; the method further comprising at the API of the first host:
intercepting and stopping the request to the central registry for the image;
downloading the image from the second host, and
storing the downloaded image in a repository of the first host.

5. The method according to claim 4, further comprising:
overriding the intercepted request to the central registry for the image from the central registry, before transmission of the request for the image; and
generating a command to download the image from the second host, when the first host receives notification that the second host holds the image.

6. The method according to claim 5, further comprising, at the first host, accessing the downloaded image via an API pull command when any other host sends a command to the first host for the image.

7. The method according to claim 1 further comprising, at the first host:
requesting the image from an Application Programming Interface, API of the second host, and
downloading the image from a registry of the second host.

8. The method according to claim 1, wherein each of the first route and the second route comprises one or more wireless links; and wherein for each route, the cost metric uses at least one of the following parameters:
(i) a number of links over which the image must be transmitted;
(ii) a communication link quality of each of the links;
(iii) a loading on any intermediate edge nodes on the route that would result from downloading the image;
(iv) a loading of each link;
(v) a financial cost of transmitting on each link.

9. The method according to claim 8, wherein when a route comprises two or more wireless links, the method further comprises:

calculating the cost metric in accordance with any of (i), (ii) or (iv); evaluating the parameter for each link in the route; and combining the evaluated parameters for each link in the route to calculate a total cost metric for the route.

10. The method according to claim 1, further comprising, when at least a second host and a third host of the at least one other host holds the image:

calculating the first value of the cost metric, for a first route over which the image could be downloaded to the first host from the second host;

calculating the second value of the cost metric, for a second route over which the image could be downloaded to the first host from the third host; and selecting the second host to provide the image over the first route when the first value of the cost metric is lower; or selecting the third host to provide the image over the second route when the second value of the cost metric is lower.

11. The method according to claim 1, further comprising receiving the image from the second host using tape archive, tar, or a file transport protocol, ftp.

12. A node of a bandwidth-constrained wireless mesh computing system operably coupled to a central registry holding images, the node comprising a registry agent and a host comprising a local registry comprising an Application Programming Interface, API, wherein the host is configured to:

receive a request from a client for an image;

send a request for the image to at least one other host of the bandwidth-constrained wireless mesh computing system;

and when the host receives notification that at least a second host holds the image, the host:

calculates a first value of a cost metric that indicates resources required to download the image, for a first route over which the image could be downloaded to the host;

calculates a second value of the cost metric for a second route over which the image could be downloaded to the host;

compares the first value of the cost metric and the second value of the cost metric, to identify a lower of the first value of the cost metric and the second value of the cost metric;

selects the first route when the first value of the cost metric is lower or selecting the second route when the second value of the cost metric is lower;

download the image from a second host over at least one wireless link of the selected route;

and when the host does not receive notification that at least a second host holds the image, download the image from the central registry located outside the bandwidth-constrained wireless mesh computing system; and create a container from the image.

13. The node according to claim 12, wherein the host comprises a registry agent configured to:

receive a request from the client for the image;

recognize the request for the image, before the request reaches the host; download the image from the second host; and store the image in a repository of the host.

14. The node according to claim 12, wherein the host comprises a local registry, the local registry comprising an API and wherein the host is further configured to:

issue a request to the central registry for the image;

and wherein the API of the local registry is configured to:

intercept and stop the request to the central registry for the image; and download the image from the second host, and store the image in a repository of the host.

15. A bandwidth-constrained wireless mesh computing system comprising a node operably coupled to a central registry holding images, the node comprising a registry agent and a host comprising a local registry comprising an Application Programming Interface, API, wherein the host is configured to:

receive a request from a client for an image;

send a request for the image to at least one other host of the bandwidth-constrained wireless mesh computing system;

and when the host receives notification that at least a second host holds the image, the host:

calculates a first value of a cost metric that indicates resources required to download the image, for a first route over which the image could be downloaded to the host;

calculates a second value of the cost metric for a second route over which the image could be downloaded to the host;

compares the first value of the cost metric and the second value of the cost metric, to identify a lower of the first value of the cost metric and the second value of the cost metric;

selects the first route when the first value of the cost metric is lower or selecting the second route when the second value of the cost metric is lower;

download the image from a second host over at least one wireless link of the selected route; and when the host does not receive notification that at least a second host holds the image, download the image from the central registry located outside the bandwidth-constrained wireless mesh computing system; and create a container from the image.

16. The node according to claim 15, wherein each of the first route and the second route comprises one or more wireless links; and wherein for each route, the cost metric uses at least one of the following parameters:

(i) a number of links over which the image must be transmitted;

(ii) a communication link quality of each of the links;

(iii) a loading on any intermediate edge nodes on the route that would result from downloading the image;

(iv) a loading of each link;

(v) a financial cost of transmitting on each link.

17. The node according to claim 16, wherein when a route comprises two or more wireless links, the host is configured to:

calculate the cost metric in accordance with any of (i), (ii) or (iv);

evaluate the parameter for each link in the route; and combine the evaluated parameters for each link in the route to calculate a total cost metric for the route.

18. The node according to claim 15, further comprising, when at least a second host and a third host of the at least one other host holds the image, the host is configured to:

calculate the first value of the cost metric, for a first route over which the image could be downloaded to the host from the second host;

calculate the second value of the cost metric, for a second route over which the image could be downloaded to the host from the third host; and select the second host to provide the image over the first route when the first value of the cost metric is lower; or select the third host to provide the image over the second route when the second value of the cost metric is lower.

19. The node according to claim 15, further comprising the host being configured to:

override the intercepted request to the central registry for the image from the central registry, before transmission of the request for the image; and generate a command to download the image from the second host, when the host receives notification that the second host holds the image.

20. The node according to claim 15, further comprising the host being configured to receive the image from the second host using one of:

tape archive, tar, a file transport protocol, ftp.

* * * * *